(12) United States Patent
Zhou et al.

(10) Patent No.: US 9,320,049 B2
(45) Date of Patent: Apr. 19, 2016

(54) USER ADMISSION FOR CO-EXISTENCE WIRELESS SYSTEMS

(71) Applicant: QUALCOMM Incorporated, San Diego, CA (US)

(72) Inventors: Yan Zhou, San Diego, CA (US); Andrei Dragos Radulescu, San Diego, CA (US); Peerapol Tinnakornsrisuphap, San Diego, CA (US); Jay Kumar Sundararajan, San Diego, CA (US); Arnaud Meylan, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 13/779,061

(22) Filed: Feb. 27, 2013

(65) Prior Publication Data

US 2014/0112169 A1    Apr. 24, 2014

Related U.S. Application Data

(60) Provisional application No. 61/716,999, filed on Oct. 22, 2012.

(51) Int. Cl.
*H04W 72/10* (2009.01)
*H04L 12/759* (2013.01)
(Continued)

(52) U.S. Cl.
CPC ............ *H04W 72/10* (2013.01); *H04L 45/028* (2013.01); *H04W 36/00* (2013.01);
(Continued)

(58) Field of Classification Search
CPC . H04W 72/10; H04W 36/00; H04W 36/0022; H04W 36/14; H04W 36/22; H04W 36/24; H04W 48/06; H04W 48/18; H04W 36/0066; H04L 45/028
USPC ........................................................ 370/465
See application file for complete search history.

(56) References Cited

U.S. PATENT DOCUMENTS 7,457,621 B2   11/2008   Zhang
7,949,812 B1    5/2011   Wong et al.
(Continued)

FOREIGN PATENT DOCUMENTS

EP          1227695 A1    7/2002
EP          1983789 A1    10/2008
(Continued)

OTHER PUBLICATIONS

G. Shrestha et al., 'A Method to Estimate the Reliability of Expert Judgement', Session 10C2, IEEE Proceedings—1989 Southeastcon. pp. 152-157.*

(Continued)

*Primary Examiner* — Melvin Marcelo
(74) *Attorney, Agent, or Firm* — Tyler J. Overall

(57) ABSTRACT

Techniques for admitting user equipments (UEs) to wireless systems are disclosed. UEs may be assigned priorities for admission to a given wireless system. The UEs may then be admitted to the wireless system based on the priorities of the UEs for the wireless system. In one design, a UE may be identified for admission to a first wireless system among a plurality of wireless systems. Attributes (e.g., capabilities) of the UE for the plurality of wireless systems may be determined. An admission priority of the UE for the first wireless system may be determined based on the attributes of the UE for the plurality of wireless systems. Whether to admit the UE to the first wireless system may be determined based on the admission priority of the UE for the first wireless system and possibly the current resource usage of the first wireless system.

38 Claims, 6 Drawing Sheets

(51) Int. Cl.
  *H04W 36/14* (2009.01)
  *H04W 48/18* (2009.01)
  *H04W 36/24* (2009.01)
  *H04W 36/00* (2009.01)
  *H04W 36/22* (2009.01)
  *H04W 48/06* (2009.01)

(52) U.S. Cl.
  CPC ......... *H04W 36/0022* (2013.01); *H04W 36/14* (2013.01); *H04W 36/22* (2013.01); *H04W 36/24* (2013.01); *H04W 48/06* (2013.01); *H04W 48/18* (2013.01); *H04W 36/0066* (2013.01)

(56) References Cited

U.S. PATENT DOCUMENTS

| | | |
|---|---|---|
| 8,200,232 B2 | 6/2012 | Lee et al. |
| 8,249,505 B1 | 8/2012 | Goldner et al. |
| 8,504,055 B2 | 8/2013 | Vikberg et al. |
| 2001/0012778 A1 | 8/2001 | Eriksson et al. |
| 2004/0180660 A1 | 9/2004 | Choi et al. |
| 2005/0066033 A1 | 3/2005 | Cheston et al. |
| 2005/0070287 A1 | 3/2005 | Cave et al. |
| 2005/0094560 A1 | 5/2005 | Montes Linares |
| 2006/0121901 A1 | 6/2006 | Tanaka et al. |
| 2007/0280161 A1 | 12/2007 | Rudrapatna et al. |
| 2008/0014957 A1 | 1/2008 | Ore |
| 2008/0170497 A1 | 7/2008 | Jeong et al. |
| 2008/0254797 A1 | 10/2008 | Achtari et al. |
| 2009/0046665 A1 | 2/2009 | Robson et al. |
| 2009/0088131 A1 | 4/2009 | Gholmieh et al. |
| 2009/0175454 A1 | 7/2009 | Watanabe et al. |
| 2009/0203375 A1 | 8/2009 | Gisby et al. |
| 2009/0232088 A1* | 9/2009 | Wisely ............ 370/331 |
| 2009/0318144 A1 | 12/2009 | Thomas et al. |
| 2010/0128696 A1 | 5/2010 | Fantini et al. |
| 2010/0220687 A1 | 9/2010 | Reznik et al. |
| 2010/0227591 A1 | 9/2010 | Park et al. |
| 2010/0240386 A1 | 9/2010 | Hamabe et al. |
| 2010/0281519 A1 | 11/2010 | Das et al. |
| 2011/0013559 A1 | 1/2011 | Marin |
| 2011/0039562 A1 | 2/2011 | Balasubramanian et al. |
| 2011/0093913 A1 | 4/2011 | Wohlert et al. |
| 2011/0110520 A1 | 5/2011 | Ness et al. |
| 2011/0176511 A1 | 7/2011 | Sayeedi |
| 2011/0195714 A1 | 8/2011 | Sawinathan |
| 2011/0244866 A1 | 10/2011 | Yamamoto et al. |
| 2011/0263250 A1 | 10/2011 | Mueck et al. |
| 2011/0312365 A1 | 12/2011 | Hatano et al. |
| 2011/0320588 A1 | 12/2011 | Raleigh |
| 2012/0014345 A1 | 1/2012 | Faurie et al. |
| 2012/0026865 A1 | 2/2012 | Fan et al. |
| 2012/0033658 A1 | 2/2012 | Ganesan |
| 2012/0044804 A1 | 2/2012 | Rahman et al. |
| 2012/0044897 A1 | 2/2012 | Wager et al. |
| 2012/0100861 A1 | 4/2012 | Zhang et al. |
| 2012/0122458 A1 | 5/2012 | Jokinen et al. |
| 2012/0149351 A1 | 6/2012 | Kalbag |
| 2012/0178467 A1 | 7/2012 | Fujii et al. |
| 2012/0196644 A1 | 8/2012 | Scherzer et al. |
| 2013/0003590 A1 | 1/2013 | Gage et al. |
| 2013/0016700 A1 | 1/2013 | Yu et al. |
| 2014/0004862 A1 | 1/2014 | Ekemark |
| 2014/0044003 A1 | 2/2014 | Drazynski et al. |
| 2014/0071967 A1 | 3/2014 | Velasco |
| 2014/0073317 A1 | 3/2014 | Zhou et al. |
| 2014/0112170 A1 | 4/2014 | Zhou |
| 2014/0112306 A1 | 4/2014 | Zhou |
| 2014/0113590 A1 | 4/2014 | Meylan |
| 2014/0113631 A1 | 4/2014 | Zhou |

FOREIGN PATENT DOCUMENTS

| | | |
|---|---|---|
| EP | 2312902 A1 | 4/2011 |
| EP | 2437546 A1 | 4/2012 |
| EP | 2571311 A1 | 3/2013 |
| WO | 2005101889 A1 | 10/2005 |
| WO | 2006075937 A1 | 7/2006 |
| WO | 2009000696 A1 | 12/2008 |
| WO | 2009152738 A1 | 12/2009 |
| WO | 2010068155 A1 | 6/2010 |
| WO | WO-2010080056 A1 | 7/2010 |
| WO | 2011054089 A1 | 5/2011 |
| WO | 2011107886 A1 | 9/2011 |
| WO | 2012121757 A1 | 9/2012 |

OTHER PUBLICATIONS

International Search Report and Written Opinion—PCT/US2013/066201—ISA/EPO—Mar. 6, 2014.

* cited by examiner

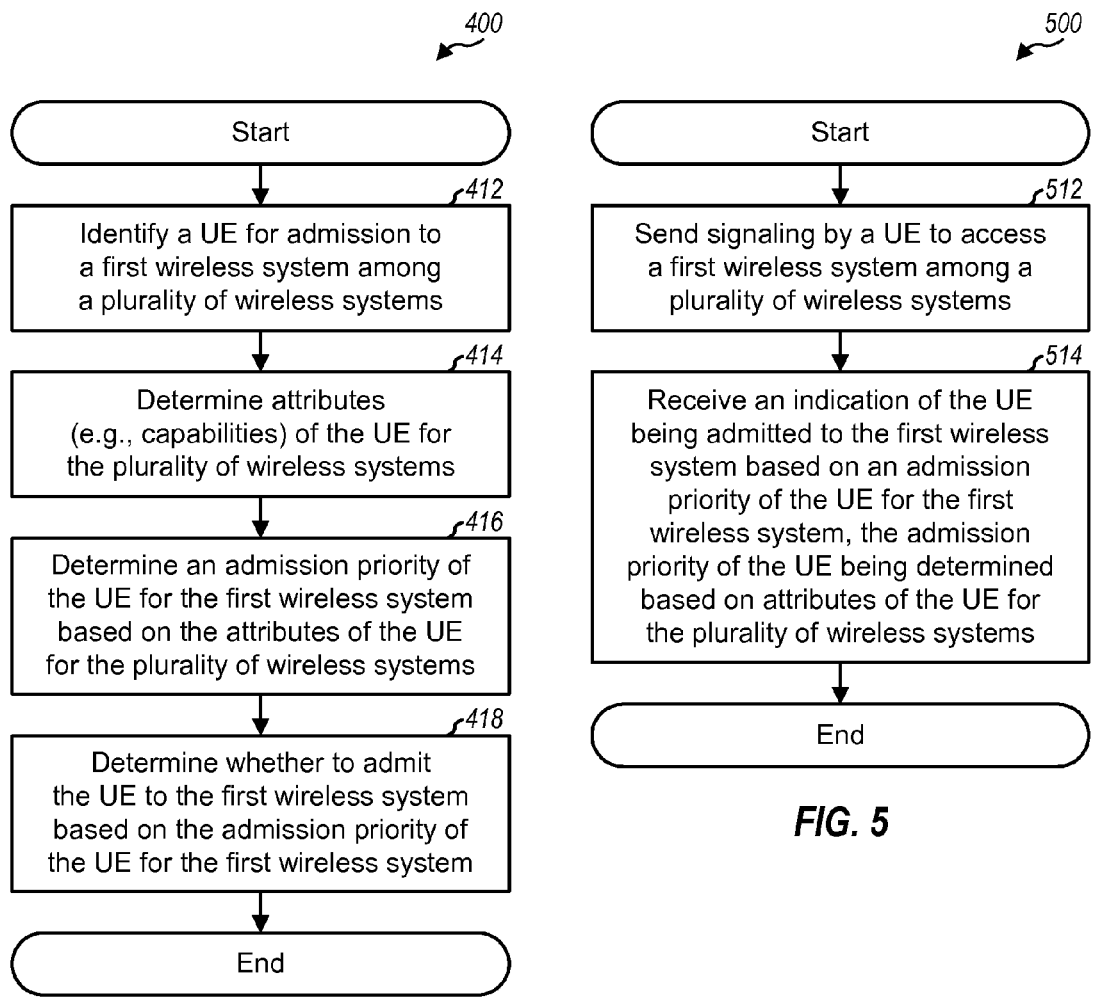

USER ADMISSION FOR CO-EXISTENCE WIRELESS SYSTEMS

The present application claims priority to provisional U.S. Application Ser. No. 61/716,999 entitled "METHOD AND APPARATUS FOR SUPPORTING WIRELESS COMMUNICATION VIA A SMALL CELL," filed Oct. 22, 2012, and incorporated herein by reference in its entirety.

BACKGROUND

I. Field

The present disclosure relates generally to communication, and more specifically to techniques for supporting wireless communication.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless system may include one or more base stations that can support communication for one or more user equipments (UEs). A UE may communicate with a base station via the downlink and uplink. The downlink (or forward link) refers to the communication link from the base station to the UE, and the uplink (or reverse link) refers to the communication link from the UE to the base station.

Multiple wireless systems utilizing different radio technologies may be deployed in a given geographic area. Any number of UEs may be located with the geographic area. Each UE may support one or more of the radio technologies utilized by the multiple wireless systems. It may be desirable to efficiently support communication for the UEs via the multiple wireless systems.

SUMMARY

Techniques for admitting UEs to wireless systems are disclosed herein. The techniques may be used for a small cell, a radio access network (RAN), a hybrid RAN, etc. A small cell may include an access point for a wireless local area network (WLAN) system and a femto cell for a cellular system. The small cell may perform certain control functions such as admitting UEs to wireless systems of the small cell. A RAN may include multiple wireless systems of the same or different radio technologies. A hybrid RAN may include multiple wireless systems of different radio technologies.

In an aspect of the present disclosure, UEs may be assigned priorities for admission to a given wireless system. The UEs may then be admitted to the wireless system based on the priorities of the UEs for the wireless system.

In one design, a UE may be identified for admission to a first wireless system among a plurality of wireless systems. Attributes (e.g., capabilities) of the UE for the plurality of wireless systems may be determined. The attributes of the UE may relate to whether the UE has ongoing traffic in the first wireless system, whether the UE has service subscription on each of the plurality of wireless systems or on only the first wireless system, service charge to the UE on each of the plurality of wireless systems, whether the UE is roaming in any of the plurality of wireless systems, capability of the UE for the first wireless system or for each wireless system, handover history of the UE for the first wireless system, channel quality of the UE for the first wireless system, some other attributes, or any combination thereof. An admission priority of the UE for the first wireless system may be determined based on the attributes of the UE for the plurality of wireless systems. Whether to admit the UE to the first wireless system may then be determined based on the admission priority of the UE for the first wireless system.

In one design, the admission priority of the UE for the first wireless system may be given by an admission threshold, which may be determined based on the attributes of the UE for the plurality of wireless systems. The admission threshold of the UE may be compared against the current resource usage or loading of the first wireless system. The UE may be admitted to the first wireless system if the current resource usage of the first wireless system is less than the admission threshold of the UE.

Various aspects and features of the disclosure are described in further detail below.

BRIEF DESCRIPTION OF THE DRAWINGS

FIG. 4 shows a process for admitting a UE to a wireless system.

FIG. 5 shows a process for accessing a wireless system by a UE.

DETAILED DESCRIPTION

The techniques described herein may be used for various wireless communication systems such as CDMA, TDMA, FDMA, OFDMA, SC-FDMA and other wireless systems. The terms "system" and "network" are often used interchangeably. A CDMA system may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless systems and radio technologies mentioned above as well as other wireless systems and radio technologies.

Figure 1:
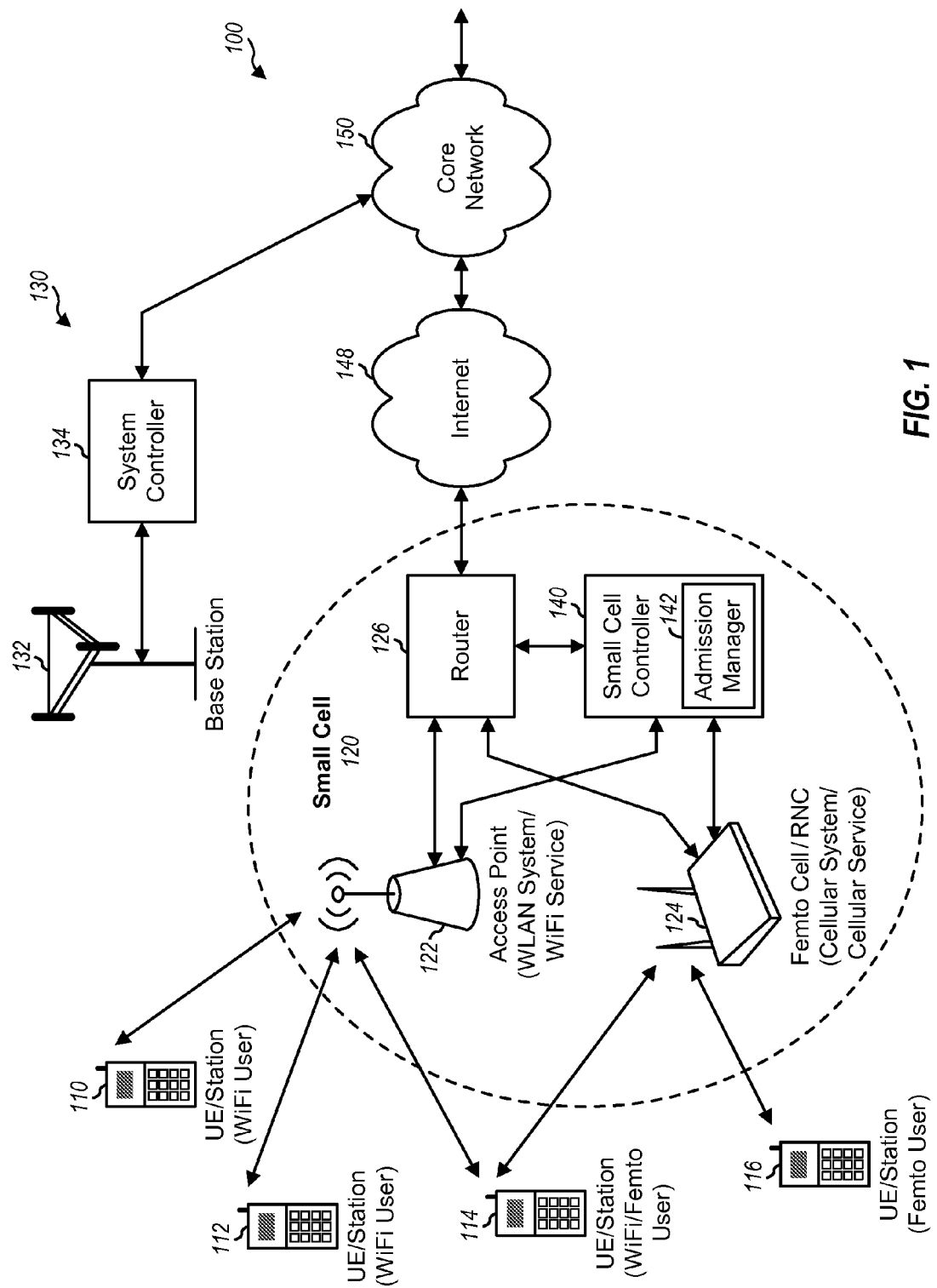
FIG. 1 shows an exemplary system deployment.

FIG. 1 shows an exemplary system deployment 100 in which various aspects of the present disclosure may be implemented. A small cell 120 may support communication for a small geographic area such as a home, an apartment, an office, a shop, etc. Small cell 120 may include an access point (AP) 122 supporting communication via a first radio technology and a femto cell 124 supporting communication via a second radio technology. Access point 122 may be part of a WLAN system, and femto cell 124 may be part of a cellular system. Small cell 120 may thus support communication for two co-existence wireless systems, which are wireless systems with overlapping coverage and under the control of a common network entity. A network entity may be any entity that is not a UE and may also be referred to as a wireless node, etc.

Access point 122 may support a radio technology such as WiFi, Hiperlan, or some other WLAN radio technology. Access point 122 may support communication for a basic service set (BSS), which includes a set of stations that can communicate with each other. The BSS may also be referred to as a WLAN system.

Femto cell 124 may support a radio technology such as LTE, WCDMA, CDMA 1X, GSM, etc. Femto cell 124 may also be referred to as a home base station (HBS), a home access point (HAP), a home Node B (HNB), a home evolved Node B (HeNB), etc. Femto cell 124 may be configured to provide restricted access for a group of UEs, which may belong in a closed subscriber group (CSG). Femto cell 124 may allow a network operator to extend the coverage of a cellular system, to increase capacity, and/or to obtain other advantages. Femto cell 124 may be considered as part of the cellular system and may communicate with other network entities in the cellular system. Femto cell 124 may operate as described in 3GPP TR 25.820, entitled "3G Home NodeB Study Item Technical Report," which is publicly available. Femto cell 124 may also operate as described in documents for other radio technologies. Femto cell 124 may include a radio network controller (RNC), which may perform some functions normally performed by an RNC in a cellular system.

Access point 122 and femto cell 124 may be coupled to a router 126, which may be coupled to the Internet 148 or some other data network. Router 126 may route traffic data between access point 122 and femto cell 124 and other entities. Access point 122 and femto cell 124 may further be coupled to a small cell controller 140, which may perform coordination and control functions for these entities. Small cell controller 140 may include various modules to perform coordination and control functions such as an admission manager 142 that can admit UEs to the WLAN system or the cellular system in small cell 120. Small cell controller 140 may communicate with entities in a core network 150, which may include various network entities supporting communication and other services for UEs.

In an exemplary design, small cell 120 may be a physical hardware module or unit (e.g., a commercially available product), which may be purchased by a user and installed in a home, an apartment, etc. The hardware module for small cell 120 may include a first module (e.g., an integrated circuit (IC) chip or a circuit board) for access point 122, a second module for femto cell 124, a third module for router 126, and a fourth module for small cell controller 140. The fourth module for small cell controller 140 may include a memory storing various software modules, one of which may be switching manager 142. In general, small cell 120 may include any number of hardware modules. Each hardware module may perform any set of functions and may support access point 122, or femto cell 124, or router 126, or small cell controller 140, or a combination thereof. The functions of each of access point 122, femto cell 124, router 126, and small cell controller 140 may be implemented in software and/or hardware on one or more hardware modules.

A base station 132 may support communication for a relatively large geographic area, e.g., up to 10 kilometer (Km) in radius. A coverage area of base station 132 and/or a base station subsystem serving this coverage area may be referred to as a macro cell. Base station 132 may be part of a cellular system 130, which may include other base stations not shown in FIG. 1 for simplicity. Cellular system 130 may support the same radio technology as femto cell 124 or a different radio technology. Base station 132 may couple to a system controller 134, which may provide coordination and control for base station 132 and other base stations. System controller 134 may further couple to core network 150.

UEs 110 to 116 may be dispersed throughout the coverage area of small cell 120, and each UE may be stationary or mobile. A UE may also be referred to as a mobile station, a terminal, an access terminal, a subscriber unit, a station (STA), etc. A UE may be a cellular phone, a smartphone, a tablet, a wireless communication device, a personal digital assistant (PDA), a wireless modem, a handheld device, a laptop computer, a cordless phone, a wireless local loop (WLL) station, a netbook, a smartbook, etc. A UE may be able to communicate with access point 122 and/or femto cell 124 in small cell 120. A UE may also be able to communicate with base station 132 in cellular system 130. A UE may be referred to as a station (e.g., when communicating with access point 122), a user, etc.

As shown in FIG. 1, small cell 120 may include co-located access point 122 providing WLAN service and femto cell 124 providing cellular service. Any number of UEs (i.e., stations or users) may be located within the coverage of small cell 120. Each UE may support only WLAN service, or only cellular service, or both WLAN and cellular services. Any number of UEs in small cell 120 may be active at any given moment. The active UEs may have different capabilities and/or data requirements. It may be desirable to efficiently serve the active UEs in small cell 120.

In an aspect of the present disclosure, techniques for admitting UEs to different wireless systems (e.g., in a small cell) are disclosed. In one design, UEs may be assigned priorities for admission to a given wireless system. These UEs may desire to access the wireless system and/or may have service subscription on the wireless system. The UEs may then be admitted to the wireless system based on the priorities of the UEs for the wireless system. The techniques may be used for multiple wireless systems in a small cell, or a RAN, or a hybrid RAN, etc.

In one design, user admission priority may be determined on a per-system basis. UEs may be assigned priorities for admission to each wireless system. For example, UEs that support only WLAN service as well as UEs that support both WLAN and cellular services may be assigned priorities for admission to the WLAN system. UEs that support only cellular service as well as UEs that support both WLAN and cellular services may be assigned priorities for admission to the cellular system. UEs may be admitted to each wireless system based on the priorities of the UEs for that wireless system. Applying user admission priority per system may result in better use of the available resources of the WLAN system and the cellular system in the small cell.

UEs may be assigned priorities for admission to a given wireless system based on various factors. The factors may relate to attributes or capabilities of the UEs for the wireless systems. In one design, a given UE X may be assigned a priority for admission to a given wireless system Y based on one or more of the following factors:

A1. Pending session on system Y—UEs with ongoing traffic in system Y have higher priority for admission to system Y than UEs without ongoing traffic in system Y, A2. Wireless system(s) available to UE X—UEs able to receive service on only system Y have higher priority for admission to system Y than UEs able to receive service on multiple systems, A3. Service charge on different wireless systems—UEs with lower service charge on only system Y have higher priority for admission to system Y than UEs with lower service charge on multiple systems, A4. Device capability—UEs with higher capability on system Y have higher priority for admission to system Y than UEs with lower capability on system Y, A5. Handover history—UEs without frequent handover history have higher priority for admission to system Y than UEs with frequent handover history, A6. Channel quality—UEs with good channel quality for system Y have higher priority for admission to system Y than UEs with poor channel quality for system Y, and A7. Other factors.

Factors A1 to A6 are listed in order of importance, in accordance with one design, with factor A1 being the most important and factor A6 being the least importance. The factors may also be assigned importance in some other order. Other factors may also be considered to determine the priorities of UEs for admission to system Y.

Factor A2 may ensure that UEs that have service subscription on only system Y and can receive service on only system Y can obtain service. UEs that can receive service on multiple systems may have lower priority for admission to system Y. These UEs may be admitted to other system(s), even though system Y may be more preferred, which may allow UEs that can receive service on only system Y to obtain service.

Factor A3 may reduce service charge for UEs. For example, UEs having service subscription on system Y but roaming in another system may have higher priority for admission to system Y so that these UEs can avoid roaming charge for other systems. UEs with low service charge for system Y as well as other systems (e.g., due to these UEs not roaming in other systems) may be admitted to other systems, if necessary, in order to allow system Y to serve UEs having low service charge for only system Y. UEs having high service charge for system Y (e.g., because of roaming in system Y) may have lower priority for admission to system Y.

Factors A4 and A6 may improve performance for both the UEs and system Y. UEs with greater capability and/or good channel quality for system Y may have higher priority for admission to system Y. These UEs may achieve better performance than other UEs with lower capability and/or poor channel quality for system Y.

Factors A1, A4, A5 and A6 may improve user experience. For factor A1, it may be desirable to have UEs that already communicate with system Y to remain on system Y, unless the benefits of switching to another system outweigh the cost of switching. The UEs already communicating with system Y may have higher priority for admission to system Y than other UEs attempting to access system Y, assuming other factors that impact admission priority are the same. For factor A5, UEs without frequent handover history may have higher priority for admission to system Y. These UEs may be more likely to remain on system Y, if they are admitted, than UEs with frequent handover history.

Other factors may also be considered in assigning UE X a priority for admission to system Y. For example, the current battery life of UE X, an expected power consumption of UE X for each system, etc., may be considered in assigning priority to UE X. In general, any factors related to (i) attributes or characteristics of UE X for system Y and possibly other co-existence systems and (ii) attributes or characteristics of system Y for UE X and other UEs may be considered in assigning UE X a priority for admission to system Y.

Small cell 120 may include a WLAN system supporting WLAN service and a cellular system supporting cellular service. In one design, priorities of UEs for admission to the WLAN system in small cell 120 may be determined based on one or more of the following factors:

B1. UEs with ongoing traffic in the WLAN system have higher priority for admission to the WLAN system than UEs without ongoing traffic in the WLAN system, B2. UEs without cellular service have higher priority for admission to the WLAN system than UEs with cellular service, B3. Among cellular-capable UEs, UEs in cellular roaming have higher priority for admission to the WLAN system than UEs not in cellular roaming, B4. UEs with high capability on the WLAN system have higher priority for admission to the WLAN system than UEs with low capability on the WLAN system, B5. UEs without frequent handover history have higher priority for admission to the WLAN system than UEs with frequent handover history, B6. UEs with good channel quality for the WLAN system have higher priority for admission to the WLAN system than UEs with poor channel quality for the WLAN system, and B7. Other factors.

Capability of a given UE X on the WLAN system may be quantified in various manners. In one design, capability of UE X on the WLAN system may be quantified based on one or more of the following:

C1. Maximum physical layer rate supported by UE X on the WLAN system,

C2. Security protocol(s) supported by UE X on the WLAN system,

C3. Maximum system bandwidth supported by UE X on the WLAN system,

C4. Operating mode(s) supported by UE X on the WLAN system, and

C5. Other factors.

The WLAN system and UE X may each support one or more standards in the 802.11 family of standards. Each 802.11 standard supports a set of data rates, one or more system bandwidths, and one or more modulation techniques. For example, legacy 802.11 supports up to 2 megabits/second (Mbps) on 20 MHz system bandwidth with direct-sequence spread spectrum (DSSS) or frequency-hopping spread spectrum (FHSS). 802.11a supports up to 54 Mbps on 20 MHz with orthogonal frequency division multiplexing (OFDM). 802.11b supports up to 11 Mbps on 20 MHz with DSSS. 802.11g supports up to 54 Mbps on 20 MHz with OFDM and DSSS. 802.11n supports up to 150 Mbps on 20 or 40 MHz with OFDM. 802.11ac supports up to 867 Mbps on up to 160 MHz with OFDM.

The WLAN system and UE X may each support one or more security protocols such as Wired Equivalent Privacy (WEP), Wi-Fi Protected Access (WPA), and WPA version 2 (WPAv2). WEP is the original security protocol for WLAN and is the least secure. WPA is an improved security protocol for WLAN, and WPA2 is an enhanced security protocol over WPA. Each security protocol may cover one or more authentication and/or encryption methods.

The capability of UE X on the WLAN system may be quantified based on one or more of the factors listed above. For example, UE X may be deemed to have low capability on the WLAN system if UE X (i) supports a low maximum physical layer rate (e.g., for 802.11b), (ii) supports an outdated security protocol (e.g., WEP and/or WPA), (iii) supports 20 MHz operation by access point 122 and does not support 40 MHz operation, and/or (iv) does not support green-field format and reduced inter-frame spacing (IFS), e.g., only supports low-efficiency operation by access point 122.

Channel quality for the WLAN system may be quantified in various manners. In one design, channel quality for the WLAN system may be quantified by a frame error rate (FER), a physical layer rate, a signal-to-noise ratio (SNR) or signal strength for the downlink and/or uplink, a channel quality indicator (CQI), a transmit power headroom, etc. For example, UE X may be deemed to have poor channel quality for the WLAN system if UE X has a high frame error rate, a low physical layer rate, a low SNR or a low signal strength for the downlink, a poor CQI, a low transmit power headroom, etc.

Some factors for determining the priorities of UEs for admission to the WLAN system have been described above. Factors B2, B3, B4 and B6 may apply to UEs capable of communicating with both WLAN system and cellular system. Factors B1 to B6 are listed in order of importance, in accordance with one design, with factor B1 being the most important and factor B6 being the least importance. The factors may also be assigned importance in some other order.

The factors for determining admission priorities may be used to admit UEs to the WLAN system in various manners. In one design, one or more factors may be used to determine an admission threshold of a UE. The admission threshold may then be used to determine whether or not to admit the UE to the WLAN system.

Figure 2:
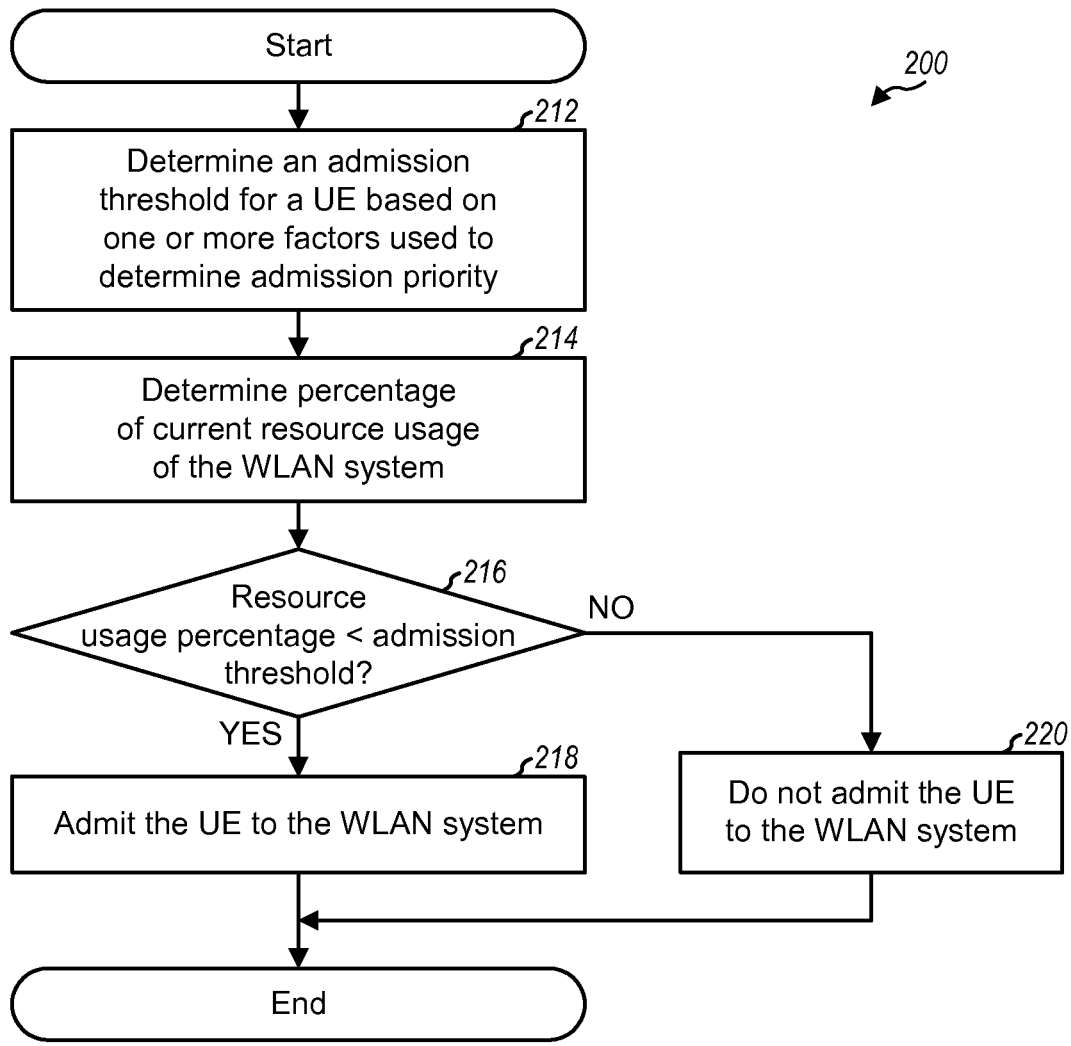
FIG. 2 shows a process for admitting a UE to a WLAN system based on an admission threshold.

FIG. 2 shows a design of a process 200 for admitting a UE to the WLAN system based on an admission threshold. The admission threshold may be determined for the UE based on one or more factors to determine admission priority, which may include some or all of the factors described above (block 212). The admission threshold may indicate a percentage of resource usage or loading of the WLAN system below which the UE can be admitted to the WLAN system. For example, an admission threshold of Q percent may mean that the UE can be admitted to the WLAN system if the percentage of resource usage of the WLAN system is Q or lower. A higher admission threshold may correspond to a higher admission priority since the UE can be admitted to the WLAN system even when the WLAN system if more fully loaded. Conversely, a lower admission threshold may correspond to a lower admission priority since the UE can be admitted to the WLAN system only if the WLAN system is lightly loaded.

The percentage of current resource usage of the WLAN system may be determined (block 214). The resource usage percentage may be quantified by a utilization percentage of a wireless medium and/or other quantities. For example, the resource usage percentage may be given by a ratio of an amount of resources (e.g., an amount of times) utilized by the WLAN system in a given time interval to a total amount of available resources for the WLAN system. A determination may be made whether the resource usage percentage of the WLAN system is less than the admission threshold of the UE (block 216). If the answer is 'Yes' for block 216, then the UE may be admitted to the WLAN system (block 218). Otherwise, if the resource usage percentage of the WLAN system is greater than the admission threshold, then the UE may not be admitted to the WLAN system (block 220). This design of admitting the UE based on the assigned admission threshold and the current resource usage of the WLAN system may enable more efficient and full use of the available system resources.

The admission threshold of the UE may be determined based on one or more factors and further based on one or more functions and/or rules. The factor(s) may be considered separately or jointly to determine the admission threshold.

Figure 3:
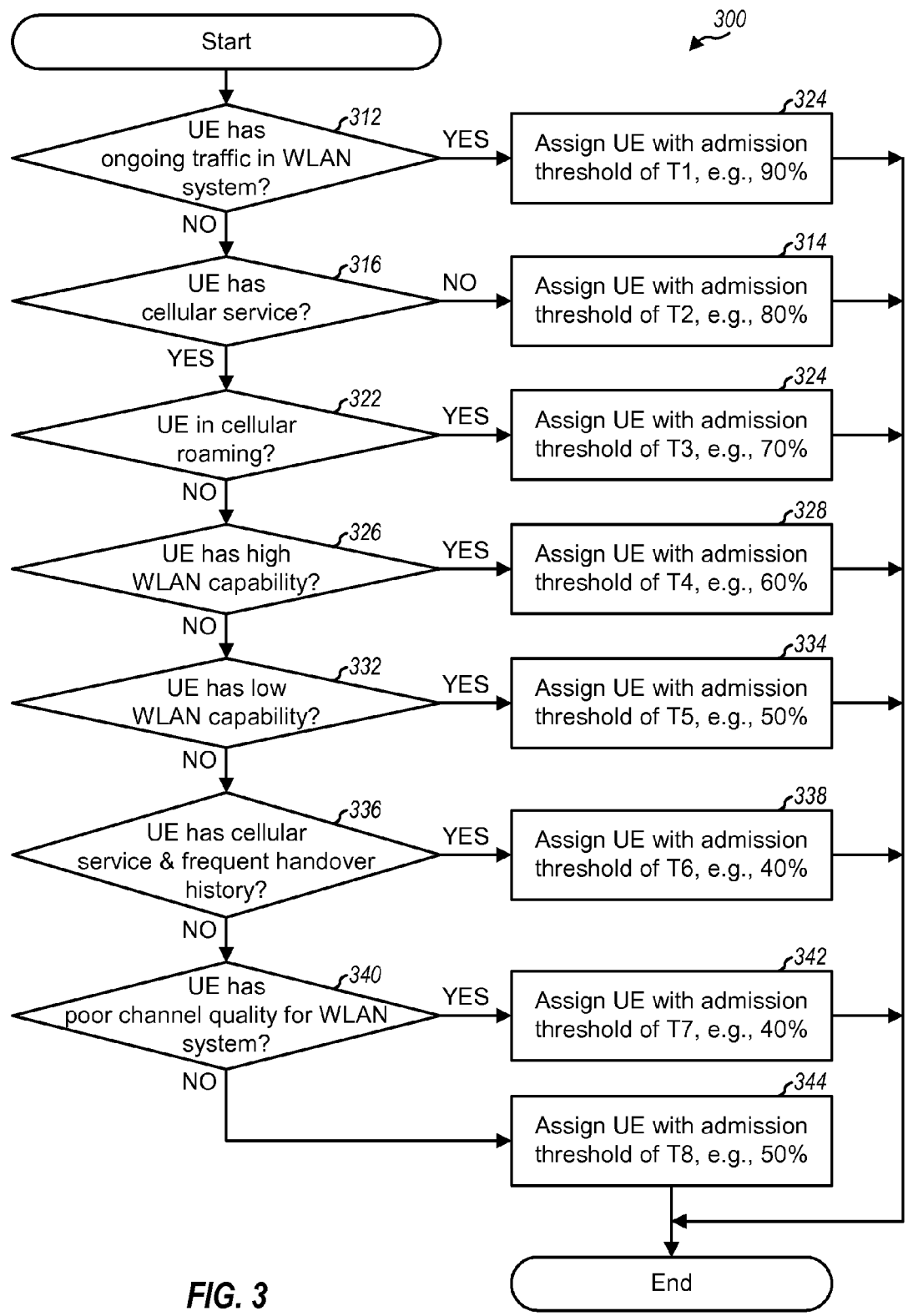
FIG. 3 shows a process for determining an admission threshold of a UE.

FIG. 3 shows a design of a process 300 for determining an admission threshold of a UE. A determination may be made whether the UE has ongoing traffic in the WLAN system (block 312). If the answer is 'Yes', then the UE may be assigned an admission threshold of T1, which may be 90% or some other value (block 314).

If the UE has no ongoing traffic in the WLAN system and the answer is 'No' for block 312, then a determination may be made whether the UE has cellular service (block 316). If the answer is 'No', then the UE may be assigned an admission threshold of T2, which may be less than T1 and may be 80% or some other value (block 318).

If the UE has cellular service and the answer is 'Yes' for block 316, then a determination may be made whether the UE is in cellular roaming (block 322). If the answer is 'Yes', then the UE may be assigned an admission threshold of T3, which may be less than T2 and may be 70% or some other value (block 324).

If the UE is not in cellular roaming and the answer is 'No' for block 322, then a determination may be made whether the UE has high WLAN capability (block 326). If the answer is 'Yes', then the UE may be assigned an admission threshold of T4, which may be less than T3 and may be 60% or some other value (block 328).

If the UE does not have high WLAN capability and the answer is 'No' for block 326, then a determination may be made whether the UE has low WLAN capability (block 332). If the answer is 'Yes', then the UE may be assigned an admission threshold of T5, which may be less than T4 and may be 50% or some other value (block 334).

If the UE does not have low WLAN capability and the answer is 'No' for block 332, then a determination may be made whether the UE has cellular service but frequent handover history (block 336). If the answer is 'Yes', then the UE may be assigned an admission threshold of T6, which may be less than T5 and may be 40% or some other value (block 338).

If the answer is 'No' for block 336, then a determination may be made whether the UE has poor channel quality for the WLAN system (block 340). If the answer is 'Yes', then the UE may be assigned an admission threshold of T7, which may be less than or equal to T6 and may be 40% or some other value (block 342). If the answer is 'No' for block 340, then the UE may be assigned an admission threshold of T8, which may be greater than or equal to T7 and may be 50% or some other value (block 344).

The admission priority of the UE may be determined based on one or more factors in other manners. The admission priority of the UE may also be used to admit the UE to the WLAN system in other manners.

In one design, for small cell 120 supporting both WLAN and cellular services, priorities of UEs for admission to the cellular system in small cell 120 may be determined based on one or more of the following factors:

D1. UEs without WLAN service have higher priority for admission to the cellular system than UEs with WLAN service, D2. UEs in cellular roaming have higher priority for admission to the cellular system than UEs not in cellular roaming, D3. UEs without frequent handover history have higher priority for admission to the cellular system than UEs with frequent handover history, D4. UEs with good channel quality for the cellular system have higher priority for admission to the cellular system than UEs with poor channel quality for the cellular system, and D5. Other factors.

Some factors for determining the priorities of UEs for admission to the cellular system have been described above. Factors D2 to D4 may apply to UEs capable of communicating with both the WLAN system and the cellular system. Factors D1 to D4 are listed in order of importance, in accordance with one design, with factor D1 being the most important and factor D4 being the least important. The factors may also be assigned importance in some other order. Other factors may also be considered to determine the priorities of UEs for admission on the cellular system.

In one design, a given UE X may be assigned an admission threshold based on one or more factors. An admission decision may be made for UE X based on its assigned admission threshold and the current load of the cellular system, e.g., in a similar manner as described above for admission to the WLAN system. The admission priority of UE X may also be determined in other manners and/or may also be used to admit UE X to the cellular system in other manners.

An admission priority of UE X may be dependent on whether UE X has service subscription on only one wireless system or on multiple wireless systems as well as the roaming state of UE X for each wireless system. Service availability and roaming state of UE X may be detected as follows.

UE X may request admission to the WLAN system and may perform authentication in the WLAN system as part of an access procedure. In this case, a determination may be made whether UE X used cellular credential for authentication in the WLAN system. The cellular credential may include a Network Access Identifier (NAI), an International Mobile Subscriber Identity (IMSI), or some other identifier/identity (ID) used in a cellular system. If cellular credential is not used for WLAN authentication, then UE X may be deemed to have only WLAN service. Otherwise, if cellular credential is used for WLAN authentication, then a determination may be made whether a current public land mobile network (PLMN) at the location of small cell 120 is a home PLMN or an equivalent PLMN of UE X based on the cellular credential. UE X may be deemed to have both WLAN and cellular services with cellular roaming if the current PLMN is not the home PLMN or an equivalent PLMN of UE X. Conversely, UE X may be deemed to have both WLAN and cellular services without cellular roaming if the current PLMN is the home PLMN or an equivalent PLMN of UE X.

UE X may request admission to the cellular system. UE X may be deemed to have service subscription, and hence can receive services, on the WLAN system and the cellular system if UE X has been identified on admission to the WLAN system. Otherwise, UE X may be deemed to have service subscription on only the cellular system.

UE X may be determined to have capability to receive WLAN service and/or cellular service in other manners. UE X may also be determined to be in cellular roaming in other manners. In any case, the supported service(s) and the roaming state of UE X may be used to determine an admission priority of UE X for the WLAN system or the cellular system.

An admission priority of UE X for the WLAN system may be dependent on whether UE X has ongoing traffic in the WLAN system. In one design, access point 122 in small cell 120 may determine whether UE X has ongoing traffic in the WLAN system based on the last access point with which UE X is associated, as follows.

UE X may send a re-association request message to a new access point. The new access point may construct a communication tunnel with UE X's prior associated access point (e.g., either over the air or via a wired network) and may obtain the re-association request message sent by UE X to the prior associated access point.

The new access point can determine an AP ID of the prior associated access point from the received re-association request message. The prior associated access point may send a traffic indicator to the new access point to indicate whether or not UE X has ongoing traffic in the WLAN system. UE X may be deemed to have ongoing traffic in the WLAN system if the prior associated access point exchanges traffic data with UE X within the last T seconds before establishment of communication tunnel with the new access point, where T may be any suitable value.

In one design, admission priorities of UEs may be determined by admission manager 142, which may be part of small cell controller 140 in FIG. 1. Admission manager 142 may be able to communicate with both the WLAN system and the cellular system in small cell 120. Admission manager 142 may determine an admission priority of a UE by taking into account various factors for the UE with respect to each wireless system, as described above. For example, admission manager 142 may determine an admission priority of the UE for admission to the WLAN system by taking into account factors related to the WLAN system (e.g., ongoing traffic) as well as factors related to the cellular system (e.g., roaming status of the UE).

FIG. 4 shows a design of a process 400 for admitting UEs to a wireless system. Process 400 may be performed by a network entity such as an admission manager, a small cell controller, a base station, a system controller, etc. A UE may be identified for admission to a first wireless system among a plurality of wireless systems (block 412). The UE may be identified based on signaling sent by the UE to request admission to the first wireless system. Attributes of the UE for the plurality of wireless systems may be determined (block 414). The attributes of the UE for the plurality of wireless systems may include capabilities of the UE for each wireless system and/or other factors. An admission priority of the UE for the first wireless system may be determined based on the attributes of the UE for the plurality of wireless systems (block 416). Whether to admit the UE to the first wireless system may then be determined based on the admission priority of the UE for the first wireless system and possibly based further on the current resource usage of the first wireless system (block 418).

The plurality of wireless systems may comprise a WLAN system and a cellular system, and the first wireless system may be the WLAN system or the cellular system. In one design, the plurality of wireless systems may be part of a small cell deployed at a particular physical location. The small cell may be designated to perform at least one control function for the plurality of wireless systems.

In one design of block 416, the admission priority of the UE for the first wireless system may be given by an admission threshold, which may be determined based on the attributes of the UE for the plurality of wireless systems. In one design of block 418, the admission threshold of the UE may be compared against the current resource usage of the first wireless system. The UE may be admitted to the first wireless system if the current resource usage of the first wireless system is less than the admission threshold of the UE.

In one design of block 414, the attributes of the UE for the plurality of wireless systems may include whether the UE has ongoing traffic in the first wireless system, whether the UE has service subscription on each of the plurality of wireless systems or on only the first wireless system, service charge to the UE on each of the plurality of wireless systems, whether the UE is roaming in any of the plurality of wireless systems, capability of the UE for the first wireless system or for each of the plurality of wireless systems, handover history of the UE for the first wireless system, channel quality of the UE for the first wireless system, some other attributes of the UE for one or more of the wireless systems, or any combination of the above.

In one design, whether the UE has ongoing traffic in the first wireless system (e.g., the WLAN system) may be determined by (i) receiving a re-association request message from the UE, (ii) obtaining an identifier of an access point previously associated with the UE based on the re-association request message, (iii) receiving a traffic indicator for the UE from the previously associated access point, and (iv) determining whether the UE has ongoing traffic in the first wireless system based on the traffic indicator. Whether the UE has ongoing traffic in the first wireless system may also be determined in other manners.

In one design, whether the UE has service subscription on a wireless system (e.g., the cellular system) may be determined by (i) obtaining a UE identity of the UE during authentication of the UE in the first wireless system and (ii) determining whether the UE has service subscription on a second wireless system, among the plurality of wireless systems, based on whether the UE identity can be used in the second wireless system. Whether the UE has service subscription on a wireless system may also be determined in other manners.

In one design, whether UE is roaming (e.g., is in cellular roaming) may be ascertained by (i) determining a network identity of a home network or an equivalent network of the UE for the second wireless system based on the UE identity for the second wireless system and (ii) determining whether the UE is roaming in the second wireless system based on the network entity of the home network or the equivalent network of the UE and a network identity of a current network for the second wireless system. Whether the UE is roaming in a wireless system may also be determined in other manners.

In one design, capability of the UE for the first wireless system may be determined based on a maximum physical layer rate supported by the UE on the first wireless system, at least one security protocol supported by the UE for the first wireless system, a maximum system bandwidth supported by the UE for the first wireless system, at least one operating mode supported by the UE for the first wireless system, other information, or any combination of the above. The capability of the UE for the first wireless system may also be determined in other manners. The capability of the UE for each of the plurality of wireless systems may also be determined and used to determine admission of the UE.

In one design, channel quality of the UE for the first wireless system may be determined based on a frame error rate, a physical layer rate, an SNR or a signal strength for downlink or uplink, a CQI, a transmit power headroom, other information, or any combination thereof. Channel quality may also be determined in other manners.

FIG. 5 shows a design of a process 500 for accessing a wireless system. Process 500 may be performed by a UE (as described below) or by some other entity. The UE may send signaling to access a first wireless system among a plurality of wireless systems (block 512). The plurality of wireless systems may include a WLAN system and a cellular system and may be part of a small cell. The UE may receive an indication of being admitted to the first wireless system based on an admission priority of the UE for the first wireless system (block 514). The admission priority of the UE may be determined based on attributes of the UE for the plurality of wireless systems.

The attributes of the UE for the plurality of wireless systems may relate to whether the UE has ongoing traffic in the first wireless system, whether the UE has service subscription on each of the plurality of wireless systems, service charge to the UE on each of the plurality of wireless systems, whether the UE is roaming in any of the plurality of wireless systems, capability of the UE for the first wireless system or for each of the plurality of wireless systems, handover history of the UE for the first wireless system, channel quality of the UE for the first wireless system, some other attribute, or any combination of the above.

Figure 6:
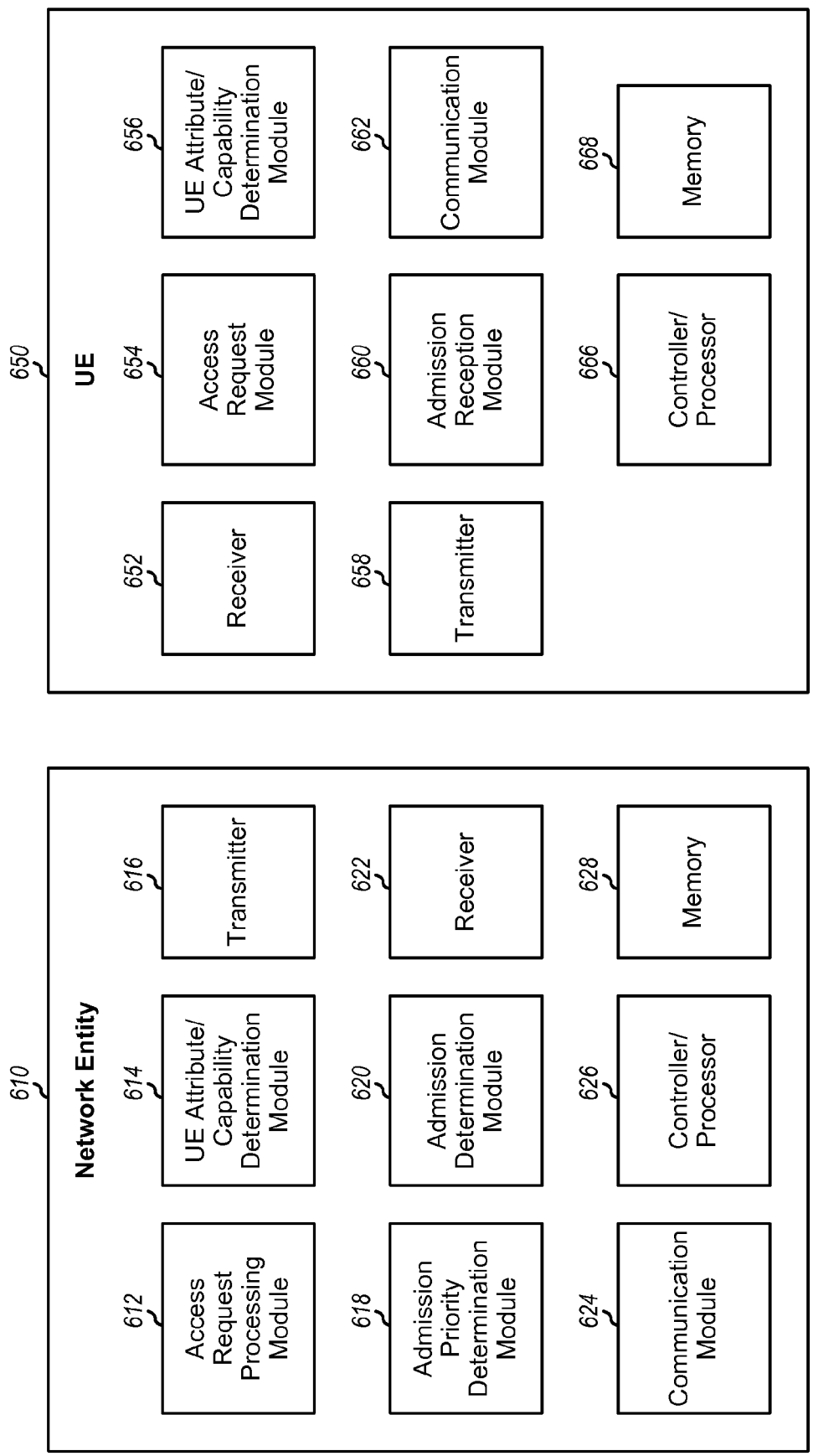
FIG. 6 shows a block diagram of a network entity and a UE.

FIG. 6 shows a block diagram of a design of a network entity 610 and a UE 650. Network entity 610 may be responsible for admission control and may correspond to admission manager 142 or small cell controller 140 in FIG. 1 or some other network entity. Network entity 610 may directly communicate with UE 650 or may communicate with UE 650 via one or more other entities. UE 650 may correspond to any of UEs 110 to 116 in FIG. 1.

At network entity 610, a module 612 may receive requests from UEs to access a wireless system among a plurality of wireless systems, e.g., a WLAN system and a cellular system in a small cell. A module 614 may determine attributes (e.g., capabilities) of UEs requesting access to the wireless system. The attributes of the UEs may correspond to some or all of factors A1 to A7, B1 to B7, or D1 to D5 described above. The attributes of the UEs may also be determined as described above. A module 618 may determine an admission priority of each UE based on the attributes of the UE for the plurality of wireless systems. A module 620 may decide to admit or deny each UE that requests access to the wireless system. A module 624 may support communication with UEs and/or other network entities. A transmitter 616 may generate and send signals comprising control information such as admission decisions for UEs. A receiver 622 may receive and process signals sent by UEs and/or other network entities. The various modules within network entity 610 may operate as described above. A controller/processor 626 may direct the operation of various modules within network entity 610. A memory 628 may store data and program codes for network entity 610.

At UE 650, a module 654 may send a request to access a wireless system among a plurality of wireless systems, e.g., a WLAN system and a cellular system in a small cell. A module 656 may determine attributes of UE 650, which may correspond to some or all of the factors described above. A module 660 may receive signaling indicating whether UE 650 has been admitted to the wireless system. A module 662 may communicate with the wireless system to which UE 650 has been admitted. A receiver 652 may receive and process signals sent by base stations and/or other network entities. A transmitter 658 may generate and send signals comprising information such access requests, the attributes of UE 650 for the plurality of wireless systems, etc. A module 662 may support communication with base stations and/or other network entities. The various modules within UE 650 may operate as described above. A controller/processor 666 may direct the operation of various modules within base station 110x. A memory 668 may store data and program codes for UE 650.

Figure 7:
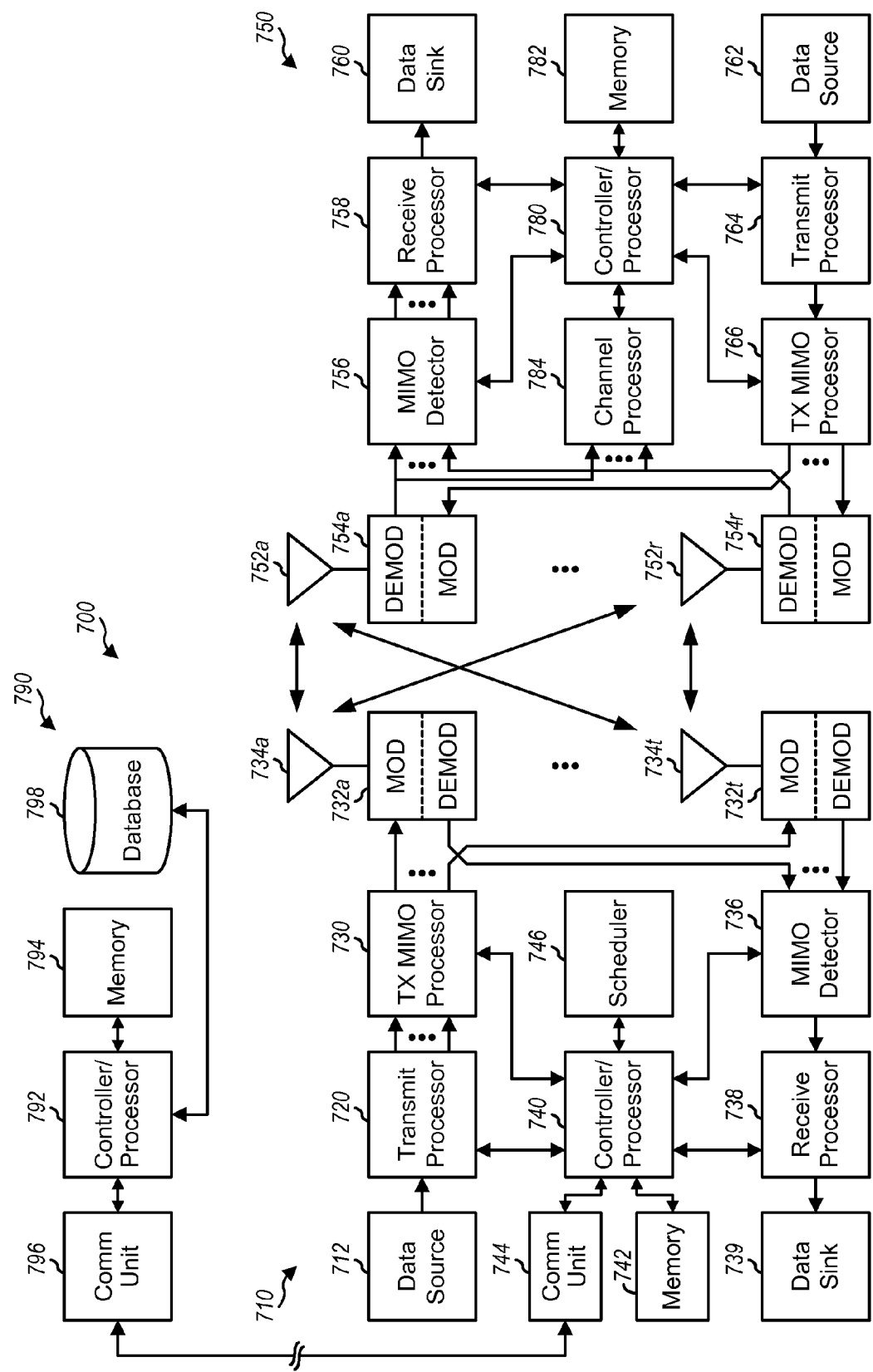
FIG. 7 shows a block diagram of a small cell and a UE.

FIG. 7 shows a block diagram of a small cell 700 and a UE 750. UE 750 may correspond to any of UEs 110 to 116 in FIG. 1. Small cell 700 may be one design of small cell 120 in FIG. 1 and may include a base station 710 and a small cell controller 790. Small cell controller 790 may correspond to small cell controller 140 in FIG. 1. Base station 710 may correspond to access point 122 or femto cell 124 in FIG. 1. Base station 710 may be equipped with T antennas 734a through 734t, and UE 750 may be equipped with R antennas 752a through 752r, where in general T≥1 and R≥1.

At base station 710, a transmit processor 720 may receive data from a data source 712 and control information (e.g., messages) from a controller/processor 740. Processor 720 may process (e.g., encode and modulate) the data and control information to obtain data symbols and control symbols, respectively. Processor 720 may also generate reference symbols for synchronization signals, reference signals, etc. A transmit (TX) multiple-input multiple-output (MIMO) processor 730 may perform spatial processing (e.g., precoding) on the data symbols, the control symbols, and/or the reference symbols, if applicable, and may provide T output symbol streams to T modulators (MODs) 732a through 732t. Each modulator 732 may process a respective output symbol stream (e.g., for OFDM, SC-FDMA, CDMA, etc.) to obtain an output sample stream. Each modulator 732 may further process (e.g., convert to analog, amplify, filter, and upconvert) the output sample stream to obtain a downlink signal. T downlink signals from modulators 732a through 732t may be transmitted via T antennas 734a through 734t, respectively.

At UE 750, antennas 752a through 752r may receive the downlink signals from base station 710 and other base stations. Antennas 752a through 752r may provide received signals to demodulators (DEMODs) 754a through 754r, respectively. Each demodulator 754 may condition (e.g., filter, amplify, downconvert, and digitize) a respective received signal to obtain input samples. Each demodulator 754 may further process the input samples (e.g., for SC-FDMA, OFDMA, CDMA, etc.) to obtain received symbols. A MIMO detector 756 may obtain received symbols from all R demodulators 754a through 754r, perform MIMO detection on the received symbols if applicable, and provide detected symbols. A receive processor 758 may process (e.g., demodulate and decode) the detected symbols, provide decoded data for UE 750 to a data sink 760, and provide decoded control information to a controller/processor 780. A channel processor 784 at UE 750 may receive downlink signals from base station 710 and/or other base stations. Processor 780 may determine channel quality for base station 710 and/or other base stations based on the received downlink signals.

On the uplink, at UE 750, a transmit processor 764 may receive data from a data source 762 and control information (e.g., messages) from controller/processor 780. Processor 764 may process (e.g., encode and modulate) the data and control information to obtain data symbols and control symbols, respectively. Processor 764 may also generate reference symbols for reference signals. The symbols from transmit processor 764 may be precoded by a TX MIMO processor 766 if applicable, further processed by modulators 754a through 754r (e.g., for OFDMA, SC-FDMA, CDMA, etc.), and transmitted to base station 710 and other base stations. At base station 710, the uplink signals from UE 750 and other UEs may be received by antennas 734, processed by demodulators 732, detected by a MIMO detector 736 if applicable, and further processed by a receive processor 738 to obtain decoded data and control information sent by UE 750 and other UEs. Processor 738 may provide the decoded data to a data sink 739 and the decoded control information to controller/processor 740.

Controllers/processors 740 and 780 may direct the operation at base station 710 and UE 750, respectively. Processor 740 and/or other processors and modules at base station 710 may perform or direct process 200 in FIG. 2, process 300 in FIG. 3, process 400 in FIG. 4, and/or other processes for the techniques described herein. Processor 780 and/or other processors and modules at UE 750 may perform or direct process 500 in FIG. 5 and/or other processes for the techniques described herein. Memories 742 and 782 may store data and program codes for base station 710 and UE 750, respectively. A communication (Comm) unit 744 may enable base station 710 to communicate with other network entities. A scheduler 746 may schedule UEs for communication and may assign resources to the scheduled UEs.

Within small cell controller 790, a controller/processor 792 may perform various functions to support communication for UEs. Processor 792 and/or other processors and modules at small cell controller 790 may perform or direct process 200, process 300, process 400, and/or other processes for the techniques described herein. A memory 794 may store program codes and data for small cell controller 790. A storage unit 794 may store information for UEs and/or wireless systems within the control of small cell controller 790. A communication unit 796 may enable small cell controller 790 to communicate with other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   identifying a user equipment (UE) for admission to a first wireless system among a plurality of wireless systems;
   determining attributes of the UE for the plurality of wireless systems, wherein the attributes are associated with an order of importance such that different types of attributes are associated with different importance;
   determining an admission priority of the UE for the first wireless system by considering the attributes of the UE for the plurality of wireless systems according to the order of importance, wherein the determined admission priority is a numerical priority associated with one of the attributes and assigned to the UE for admission of the UE to the first wireless system; and
   determining whether to admit the UE to the first wireless system based on the admission priority of the UE for the first wireless system.

2. The method of claim 1, wherein the determining whether to admit the UE comprises determining whether to admit the UE to the first wireless system based further on current resource usage of the first wireless system.

3. The method of claim 1, wherein the determining an admission priority of the UE for the first wireless system comprises determining an admission threshold of the UE for the first wireless system based on the attributes of the UE for the plurality of wireless systems.

4. The method of claim 3, wherein the determining whether to admit the UE to the first wireless system comprises
   comparing the admission threshold of the UE against current resource usage of the first wireless system, and
   admitting the UE to the first wireless system if the current resource usage of the first wireless system is less than the admission threshold of the UE.

5. The method of claim 1, wherein the determining attributes of the UE for the plurality of wireless systems comprises determining whether the UE has ongoing traffic in the first wireless system.

6. The method of claim 5, wherein the determining whether the UE has ongoing traffic in the first wireless system comprises
   receiving a re-association request message from the UE,
   obtaining an identifier of an access point previously associated with the UE based on the re-association request message,
   receiving a traffic indicator for the UE from the previously associated access point, and
   determining whether the UE has ongoing traffic in the first wireless system based on the traffic indicator.

7. The method of claim 1, wherein the determining attributes of the UE for the plurality of wireless systems comprises determining whether the UE has service subscription on each of the plurality of wireless systems.

8. The method of claim 1, wherein the determining attributes of the UE for the plurality of wireless systems comprises determining whether the UE has service subscription on only the first wireless system.

9. The method of claim 8, wherein the determining whether the UE has service subscription on each of the plurality of wireless systems comprises
   obtaining a UE identity of the UE during authentication of the UE in the first wireless system, and
   determining whether the UE has service subscription on a second wireless system based on whether the UE identity can be used in the second wireless system.

10. The method of claim 9, further comprising:
   determining a network identity of a home network or an equivalent network of the UE for the second wireless system based on the UE identity for the second wireless system; and
   determining whether the UE is roaming in the second wireless system based on the network entity of the home network or the equivalent network of the UE and a network identity of a current network for the second wireless system.

11. The method of claim 1, wherein the determining attributes of the UE for the plurality of wireless systems comprises determining service charge to the UE on each of the plurality of wireless systems.

12. The method of claim 1, wherein the determining attributes of the UE for the plurality of wireless systems comprises determining whether the UE is roaming in any of the plurality of wireless systems.

13. The method of claim 1, wherein the determining attributes of the UE for the plurality of wireless systems comprises determining capability of the UE for the first wireless system.

14. The method of claim 1, wherein the determining attributes of the UE for the plurality of wireless systems comprises determining capability of the UE for each of the plurality of wireless systems.

15. The method of claim 14, wherein the determining capability of the UE for the first wireless system comprises
determining the capability of the UE based on at least one of a maximum physical layer rate supported by the UE on the first wireless system, at least one security protocol supported by the UE on the first wireless system, a maximum system bandwidth supported by the UE on the first wireless system, or at least one operating mode supported by the UE on the first wireless system.

16. The method of claim 1, wherein the determining attributes of the UE for the plurality of wireless systems comprises determining handover history of the UE for the first wireless system.

17. The method of claim 1, wherein the determining attributes of the UE for the plurality of wireless systems comprises determining channel quality of the UE for the first wireless system.

18. The method of claim 17, wherein the determining channel quality of the UE for the first wireless system comprises determining the channel quality of the UE for the first wireless system based on at least one of a frame error rate (FER), a physical layer rate, a signal-to-noise ratio (SNR), a signal strength, a channel quality indicator (CQI), or a transmit power headroom.

19. The method of claim 1, wherein the plurality of wireless systems comprise a wireless local area network (WLAN) system and a cellular system.

20. The method of claim 1, wherein the plurality of wireless systems are part of a small cell designated to perform at least one control function for the plurality of wireless systems.

21. An apparatus for wireless communication, comprising:
at least one processor configured to:
identify a user equipment (UE) for admission to a first wireless system among a plurality of wireless systems;
determine attributes of the UE for the plurality of wireless systems, wherein the attributes are associated with an order of importance such that different types of attributes are associated with different importance;
determine an admission priority of the UE for the first wireless system by considering the attributes of the UE for the plurality of wireless systems according to the order of importance, wherein the determined admission priority is a numerical priority associated with one of the attributes and assigned to the UE for admission of the UE to the first wireless system; and
determine whether to admit the UE to the first wireless system based on the admission priority of the UE for the first wireless system.

22. The apparatus of claim 21, wherein the at least one processor is configured to determine an admission threshold of the UE for the first wireless system based on the attributes of the UE for the plurality of wireless systems.

23. The apparatus of claim 22, wherein the at least one processor is configured to:
compare the admission threshold of the UE against current resource usage of the first wireless system, and
admit the UE to the first wireless system if the current resource usage of the first wireless system is less than the admission threshold of the UE.

24. The apparatus of claim 21, wherein the attributes of the UE for the plurality of wireless systems relate to at least one of whether the UE has ongoing traffic in the first wireless system, whether the UE has service subscription on each of the plurality of wireless systems, service charge to the UE on each of the plurality of wireless systems, whether the UE is roaming in any of the plurality of wireless systems, capability of the UE for the first wireless system or for each of the plurality of wireless systems, handover history of the UE for the first wireless system, or channel quality of the UE for the first wireless system.

25. An apparatus for wireless communication, comprising:
means for identifying a user equipment (UE) for admission to a first wireless system among a plurality of wireless systems;
means for determining attributes of the UE for the plurality of wireless systems, wherein the attributes are associated with an order of importance such that different types of attributes are associated with different importance;
means for determining an admission priority of the UE for the first wireless system by considering the attributes of the UE for the plurality of wireless systems according to the order of importance, wherein the determined admission priority is a numerical priority associated with one of the attributes and assigned to the UE for admission of the UE to the first wireless system; and
means for determining whether to admit the UE to the first wireless system based on the admission priority of the UE for the first wireless system.

26. The apparatus of claim 25, wherein the means for determining an admission priority of the UE for the first wireless system comprises
means for determining an admission threshold of the UE for the first wireless system based on the attributes of the UE for the plurality of wireless systems.

27. The apparatus of claim 26, wherein the means for determining whether to admit the UE to the first wireless system comprises
means for comparing the admission threshold of the UE against current resource usage of the first wireless system, and
means for admitting the UE to the first wireless system if the current resource usage of the first wireless system is less than the admission threshold of the UE.

28. The apparatus of claim 25, wherein the attributes of the UE for the plurality of wireless systems relate to at least one of whether the UE has ongoing traffic in the first wireless system, whether the UE has service subscription on each of the plurality of wireless systems, service charge to the UE on each of the plurality of wireless systems, whether the UE is roaming in any of the plurality of wireless systems, capability of the UE for the first wireless system or for each of the plurality of wireless systems, handover history of the UE for the first wireless system, or channel quality of the UE for the first wireless system.

29. A non-transitory computer-readable medium comprising:
code for causing at least one processor to identify a user equipment (UE) for admission to a first wireless system among a plurality of wireless systems;
code for causing the at least one processor to determine attributes of the UE for the plurality of wireless systems, wherein the attributes are associated with an order of importance such that different types of attributes are associated with different importance;
code for causing the at least one processor to determine an admission priority of the UE for the first wireless system by considering the attributes of the UE for the plurality of wireless systems according to the order of importance, wherein the determined admission priority is a numerical priority associated with one of the attributes and assigned to the UE for admission of the UE to the first wireless system; and
code for causing the at least one processor to determine whether to admit the UE to the first wireless system based on the admission priority of the UE for the first wireless system.

30. A method for wireless communication, comprising:
sending signaling by a user equipment (UE) to access a first wireless system among a plurality of wireless systems; and
receiving an indication of the UE being admitted to the first wireless system based on an admission priority of the UE for the first wireless system, the admission priority of the UE being determined based on attributes of the UE for the plurality of wireless systems, wherein the attributes are associated with an order of importance such that different types of attributes are associated with different importance and the admission priority is determined by considering the attributes of the UE according to the order of importance, wherein the admission priority is a numerical priority associated with one of the attributes and assigned to the UE for admission of the UE to the first wireless system.

31. The method of claim 30, wherein the attributes of the UE for the plurality of wireless systems relate to at least one of whether the UE has ongoing traffic in the first wireless system, whether the UE has service subscription on each of the plurality of wireless systems, service charge to the UE on each of the plurality of wireless systems, whether the UE is roaming in any of the plurality of wireless systems, capability of the UE for the first wireless system or for each of the plurality of wireless systems, handover history of the UE for the first wireless system, or channel quality of the UE for the first wireless system.

32. The method of claim 30, wherein the plurality of wireless systems comprise a wireless local area network (WLAN) system and a cellular system.

33. The method of claim 30, wherein the plurality of wireless systems are part of a small cell designated to perform at least one control function for the plurality of wireless systems.

34. An apparatus for wireless communication, comprising:
at least one processor configured to:
send signaling by a user equipment (UE) to access a first wireless system among a plurality of wireless systems; and
receive an indication of the UE being admitted to the first wireless system based on an admission priority of the UE for the first wireless system, the admission priority of the UE being determined based on attributes of the UE for the plurality of wireless systems, wherein the attributes are associated with an order of importance such that different types of attributes are associated with different importance and the admission priority is determined by considering the attributes of the UE according to the order of importance, wherein the admission priority is a numerical priority associated with one of the attributes and assigned to the UE for admission of the UE to the first wireless system.

35. The apparatus of claim 34, wherein the attributes of the UE for the plurality of wireless systems relate to at least one of whether the UE has ongoing traffic in the first wireless system, whether the UE has service subscription on each of the plurality of wireless systems, service charge to the UE on each of the plurality of wireless systems, whether the UE is roaming in any of the plurality of wireless systems, capability of the UE for the first wireless system or for each of the plurality of wireless systems, handover history of the UE for the first wireless system, or channel quality of the UE for the first wireless system.

36. An apparatus for wireless communication, comprising:
means for sending signaling by a user equipment (UE) to access a first wireless system among a plurality of wireless systems; and
means for receiving an indication of the UE being admitted to the first wireless system based on an admission priority of the UE for the first wireless system, the admission priority of the UE being determined based on attributes of the UE for the plurality of wireless systems, wherein the attributes are associated with an order of importance such that different types of attributes are associated with different importance and the admission priority is determined by considering the attributes of the UE according to the order of importance, wherein the admission priority is a numerical priority associated with one of the attributes and assigned to the UE for admission of the UE to the first wireless system.

37. The apparatus of claim 36, wherein the attributes of the UE for the plurality of wireless systems relate to at least one of whether the UE has ongoing traffic in the first wireless system, whether the UE has service subscription on each of the plurality of wireless systems, service charge to the UE on each of the plurality of wireless systems, whether the UE is roaming in any of the plurality of wireless systems, capability of the UE for the first wireless system or for each of the plurality of wireless systems, handover history of the UE for the first wireless system, or channel quality of the UE for the first wireless system.

38. A non-transitory computer-readable medium comprising:
code for causing at least one processor to send signaling by a user equipment (UE) to access a first wireless system among a plurality of wireless systems; and
code for causing the at least one processor to receive an indication of the UE being admitted to the first wireless system based on an admission priority of the UE for the first wireless system, the admission priority of the UE being determined based on attributes of the UE for the plurality of wireless systems, wherein the attributes are associated with an order of importance such that different types of attributes are associated with different importance and the admission priority is determined by considering the attributes of the UE according to the order of importance, wherein the admission priority is a numerical priority associated with one of the attributes and assigned to the UE for admission of the UE to the first wireless system.

* * * * *